(No Model.)
S. A. TWIST.
FLOUR BIN AND SIFTER.
No. 466,706. Patented Jan. 5, 1892.
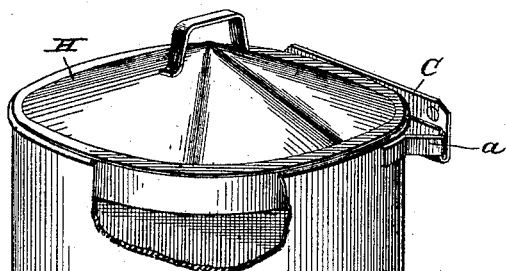
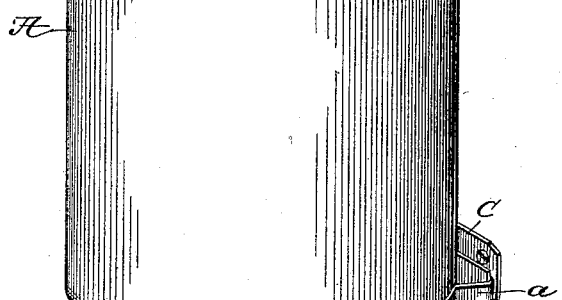
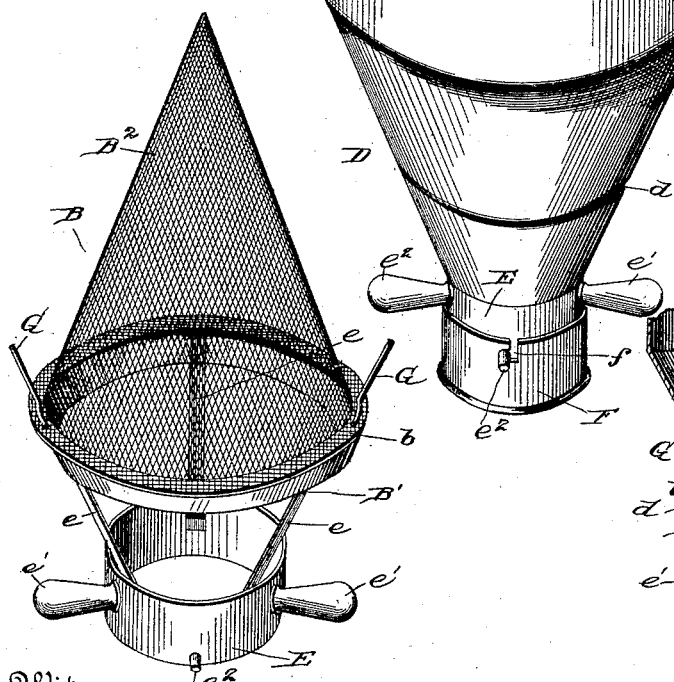
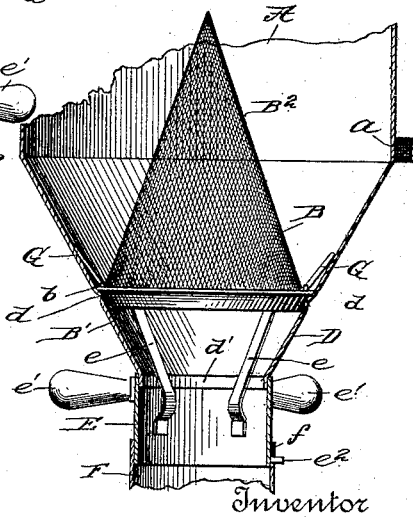
Witnesses
Inventor
Sylvester Albert Twist.
By his Attorneys

United States Patent Office.

SYLVESTER ALBERT TWIST, OF COLDWATER, MICHIGAN.

FLOUR BIN AND SIFTER.

SPECIFICATION forming part of Letters Patent No. 466,706, dated January 5, 1892.

Application filed November 6, 1890. Serial No. 370,588. (No model.)

*To all whom it may concern:*

Be it known that I, SYLVESTER ALBERT TWIST, a citizen of the United States, residing at Coldwater, in the county of Branch and State of Michigan, have invented certain new and useful Improvements in Flour Bins and Sifters; and I do hereby declare the following to be a full, clear, and exact description of the invention, such as will enable others skilled in the art to which it appertains to make and use the same.

This invention relates to combined flour bins and sifters.

The object of the invention is to provide a simple, cheap, and efficient device for storing the flour and in which the rotatable sieve which forms the bottom of the bin can be conveniently operated from a band which serves as a spout to sieve the flour, and which will be provided with agitators to stir the flour and keep the same from choking in the lower end of the bin.

The improvement consists of the novel features, which will be hereinafter more fully described and claimed, and which are shown in the annexed drawings, in which—

Figure 1 is a perspective view, parts being broken away, of the invention. Fig. 2 is a vertical section of the lower portion of the device. Fig. 3 is a perspective view of the sieve and the band or ring and the connections between the sieve and the said band.

The bin A, which may be of any size and form, is preferably circular in form, and is provided on one side with the loops $a\ a$, which are adapted to enter hooked plates C C on the wall or other support and suspend the device while in use. The lower end D of the bin is funnel-shaped. The sieve B is located in the contracted portion D, and is supported on the inner rib $d$, which is spun therein, as shown. The outer flange $b$ of the sieve-frame B' rests upon the rib $d$ and supports the sieve without causing any binding between it and the sides of the contracted portion D. The frame B' flares from bottom to top and has the screening B² secured thereto. The screening may be of the usual form—*i. e.*, flat; but it is preferred to have it raised or conical-shaped, as a greater screening-surface is thereby obtained. The ring or band E has its upper end fitted over the vertical flange $d'$ at the lower end of the contracted portion D, and is connected with the sieve by the bars $e$. Obviously by rotating or twirling the band E back and forth the sieve will be operated and the flour contained in the bin will be sifted. To facilitate the twirling of the band, knobs $e'$ are provided and secured thereto. The lower end of the band E is closed by the cap F, the latter being held thereon by the L-shaped slot $f$ and the pin $e^2$, the latter projecting from the band and adapted to enter the said slot. The agitators G, projected up from the sieve, stir the flour and prevent the same banking on the sides of the bin. These agitators are parallel with the inclined sides of the contracted portion D. The top of the bin is closed by the cover H.

To sift the flour the cap F is removed and the band E turned back and forth until the required amount of sifted flour is obtained, the same being received in a vessel held at the lower end of the said band E.

Having thus described my invention, what I claim, and desire to secure by Letters Patent, is—

1. The combination, with the bin, of the rotatable sieve supported in the lower end of the bin and provided with agitators, the band E, fitted over the lower end of the bin, and connections between the band and the sieve, substantially as described.

2. The combination, with the bin contracted at its lower end and having an inner rib, of the rotatable sieve having an outer flange which rests upon the said rib and having agitators parallel with the sides of the contracted portion of the bin, and the band having its upper end encircling a flange at the lower end of the bin and provided with knobs, and connections between the band and sieve, substantially as set forth.

In testimony whereof I affix my signature in presence of two witnesses.

SYLVESTER ALBERT TWIST.

Witnesses:
D. S. GREENAMYER,
F. J. BARRELL.